(12) United States Patent
Ke

(10) Patent No.: US 8,498,070 B2
(45) Date of Patent: Jul. 30, 2013

(54) VOICE COIL MOTOR AND CAMERA MODULE WITH SAME

(75) Inventor: Chau-Yuan Ke, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 387 days.

(21) Appl. No.: 12/797,495

(22) Filed: Jun. 9, 2010

(65) Prior Publication Data

US 2011/0235196 A1 Sep. 29, 2011

(30) Foreign Application Priority Data

Mar. 26, 2010 (TW) ................................ 99108997 A

(51) Int. Cl.
*G02B 7/02* (2006.01)

(52) U.S. Cl.
USPC ............................ 359/824; 359/822; 359/823

(58) Field of Classification Search
USPC .................... 359/694, 696, 822–824
See application file for complete search history.

(56) References Cited

U.S. PATENT DOCUMENTS

| | | | |
|---|---|---|---|
| 2008/0062535 A1* | 3/2008 | Lin | 359/694 |
| 2009/0122420 A1* | 5/2009 | Sue et al. | 359/696 |
| 2011/0241450 A1* | 10/2011 | Hsu | 310/12.16 |

* cited by examiner

*Primary Examiner* — Mahidere Sahle

(74) *Attorney, Agent, or Firm* — Altis Law Group, Inc.

(57) ABSTRACT

A voice coil motor includes an outer shell, a fastening member, magnetic members, a base, first and second elastic members, and a movable assembly. The outer shell has a through hole defined therein and includes sidewalls surrounding the through hole. The first elastic member includes a ring-shaped first elastic portion. The fastening member fastens the first elastic member on the outer shell. The magnetic members are mounted on the inside of the sidewalls, respectively. The second elastic member is fixed on the base and includes a ring-shaped second elastic portion. The movable assembly includes a retainer wrapped in a coil of wire, the retainer is connected to the first and second elastic portions, and is movable in the outer shell under an interaction between the magnetic members and the coil of wire. A camera module using the voice coil motor is also provided.

10 Claims, 4 Drawing Sheets

VOICE COIL MOTOR AND CAMERA MODULE WITH SAME

CROSS-REFERENCE TO RELATED APPLICATION

This application is related to a commonly-assigned co-pending application entitled "VOICE COIL MOTOR AND CAMERA MODULE USING SAME" Ser. No. 12/797,464. The disclosure of the above-identified application is incorporated herein by reference.

BACKGROUND

1. Technical Field

The present disclosure relates to motors, and particularly to a voice coil motor and a camera module with same.

2. Description of Related Art

Voice coil motors (VCMs) are widely used, for example, as lens actuators in camera modules. Camera modules are becoming progressively more miniaturized over time, and thus VCMs are correspondingly being required to be made smaller and smaller.

A typical VCM includes an outer shell housing one or more magnets fixed to a frame, a lens retainer wrapped by a coil of wire, and one or two elastic members connected between the lens retainer and the frame. The lens retainer is movable in the outer shell due to an interaction between the coil of wire and the magnetic members.

However, with the above configuration, too many elements are needed for the VCM. In addition, when the VCM is used in a camera module, a base is also needed for accommodating an image sensor, thus the entire camera module is not compact.

What is needed, therefore, is a voice coil motor and a camera module, which can overcome the above shortcomings.

BRIEF DESCRIPTION OF THE DRAWINGS

Many aspects of the present voice coil motor and camera module can be better understood with reference to the following drawings. The components in the drawings are not necessarily drawn to scale, the emphasis instead being placed upon clearly illustrating the principles of the present voice coil motor and camera module. Moreover, in the drawings, like reference numerals designate corresponding parts throughout the several views.

DETAILED DESCRIPTION

Embodiments of the present voice coil motor (VCM) and camera module will now be described in detail below and with reference to the drawings.

Figure 1:
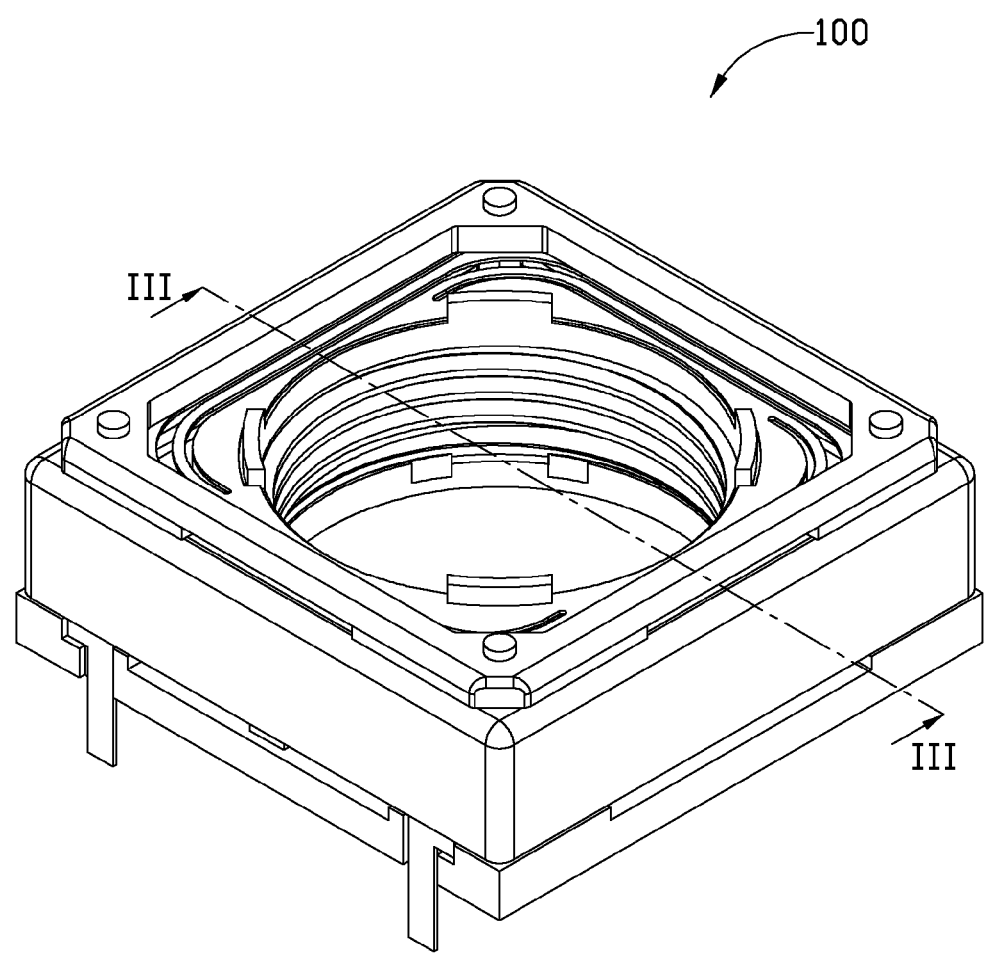
FIG. 1 is a schematic view of a voice coil motor in accordance with a first embodiment.
Figure 2:
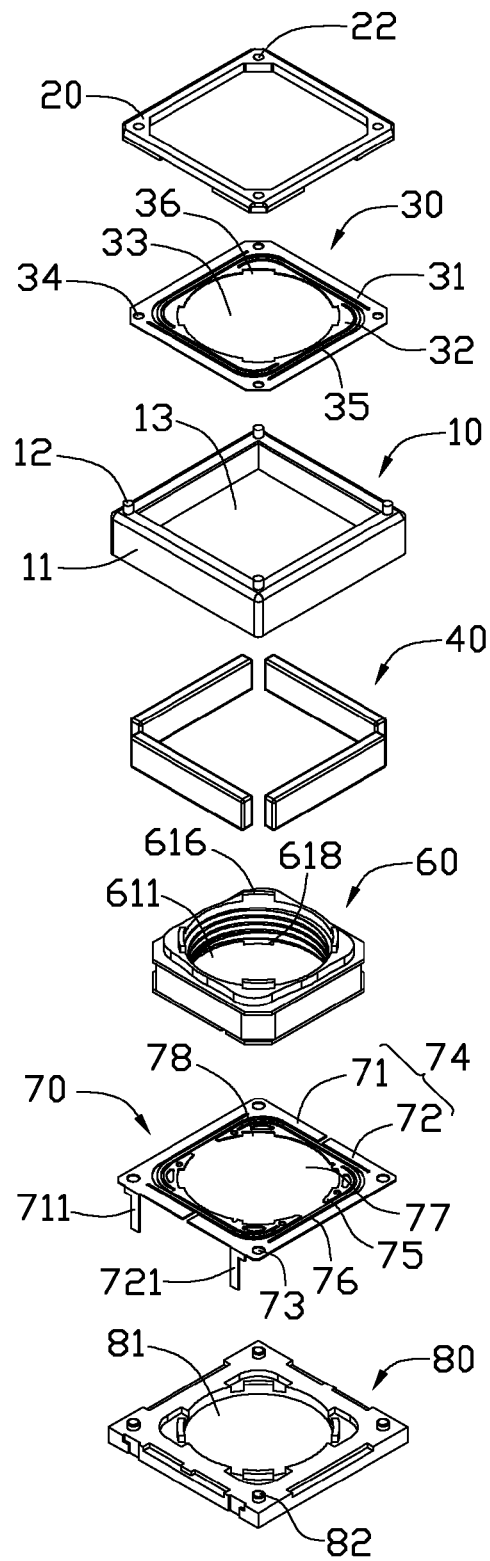
FIG. 2 is an exploded view of the voice coil motor of FIG. 1.
Figure 3:
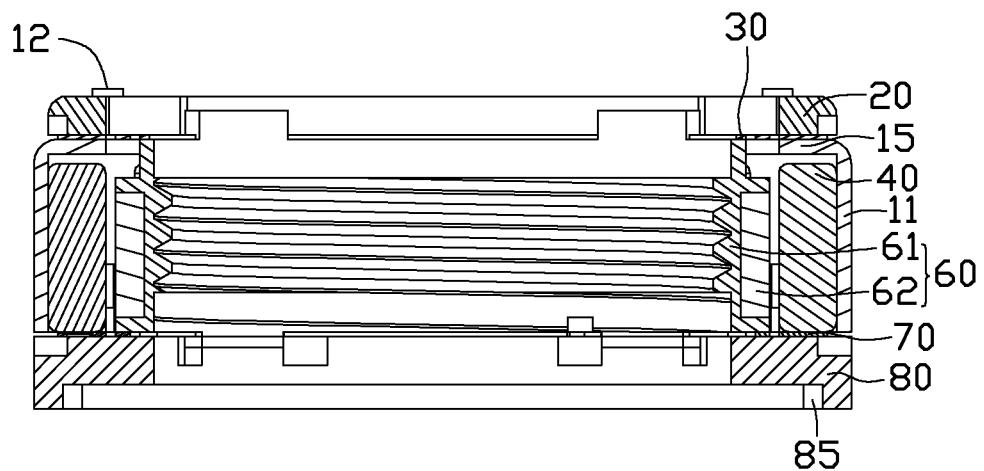
FIG. 3 is a cross-sectional view of the voice coil motor shown in FIG. 1, taken along line III-III.

Referring to FIGS. 1 to 3, a VCM 100 in accordance with a first embodiment is provided. The VCM 100 mainly includes an outer shell 10, a fastening member 20, an upper elastic member (first elastic member) 30, four magnetic members 40, a movable assembly 60, a lower elastic member (second elastic member) 70, and a base 80.

The outer shell 10 has a through hole 13 defined therein, and includes four sidewalls 11 surrounding the through hole 13 and a top tab 15 integrally formed with the sidewalls 11 and extending inwards the through hole 13. The top tab 15 has four protrusions 12 formed thereon. The outer shell 10 houses the magnetic members 40 and the movable assembly 60 therein. The outer shell 10 is made of electrically conductive materials, such as a conductive alloy, a conductive polymer, or conductive glass, whereby the outer shell 10 provides electro magnetic interference (EMI) shielding for the voice coil motor 100.

The upper elastic member 30 includes an elastic portion 32, a rigid portion 31 surrounding the elastic portion 32, and a plurality of substantially L-shaped slots 35 arranged between the rigid portion 31 and the elastic portion 32. The elastic portion 32 has a through hole 33 formed in a center thereof, and four recesses 36 formed in the inner wall of the elastic portion 32. The slots 35 contribute to the elasticity of the elastic portion 31. The rigid portion 31 has four first engaging holes 34 formed at four corners 31.

The fastening member 20 is rectangular-shaped. The fastening member 20 has four second engaging holes 22 formed therein. The upper elastic member 30 is sandwiched between the outer shell 10 and the fastening member 20, and the protrusions 12 extend through and engaged with the first engaging holes 22 and the second engaging holes 34.

The four magnetic members 40 are permanent magnets. The four magnets 40 are directly mounted on the inside of the four sidewalls 11 rather than on an extra fixing frame.

The movable assembly 60 includes a ring-shaped retainer 61 wrapped in a coil of wire 62. The retainer 61 has four top protrusions 616 and four bottom protrusions 618 extending thereon. The retainer 61 has a receiving space 611 defined therein. The outer wall of the retainer 61 is substantially rectangular-shaped, whereas the inner wall of the retainer 61 is circular. An inner thread is formed on the inner wall of the retainer 61, and configured for threadedly retaining a lens module (see FIG. 4) therein.

The lower elastic member 70 includes an elastic portion 75, a rigid portion 74 and a plurality of L-shaped slots 76 arranged between the elastic portion 75 and the rigid portion 74. The elastic portion 75 has a through hole 77 formed in a center thereof. The rigid portion includes a first part 71 and a second part 72 spaced from the first part 71. The first part 71 has a first lead 711 extending therefrom, and the second part 72 has a second lead 721 extending therefrom. The first part 71 and the second part 72 are electrically connected to the two ends of the coil of wire 62, and the first lead 711 and the second lead 721 are electrically connected to an outside power supply. In this way, the coil of wire 62 can be charged.

The first part 71 and the second part 72 each further have two engaging holes 73 formed therein. The elastic portion 75 further has four recesses 78 formed in the inner wall thereof.

The base 80 is ring-shaped, and has a through hole 81 formed in a center thereof and accommodating space 85 in communication with the through hole 81. The accommodating space 85 can accommodate an image sensor (see FIG. 4) therein. The base 80 further has four protrusions 82 thereon. The protrusions 82 are engaged in the engaging holes 73 of the lower elastic member 70, respectively, and glue may be applied thereon to further fix the lower elastic member 70 to the base 80.

The protrusions 616 of the retainer 61 are engaged in the recesses 36 of the upper elastic member 30, and the protrusions 618 of the retainer 61 are engaged in the recesses 78 of the lower elastic member 70. Glue may be applied to the protrusions 616, 618 to fix the retainer 61 to the elastic portions 31 and 75.

In application, the movable assembly 60 is movable upwards and downwards in the outer shell 10 due to the interaction between the coil of wire 62 and the magnetic members 40.

Figure 4:
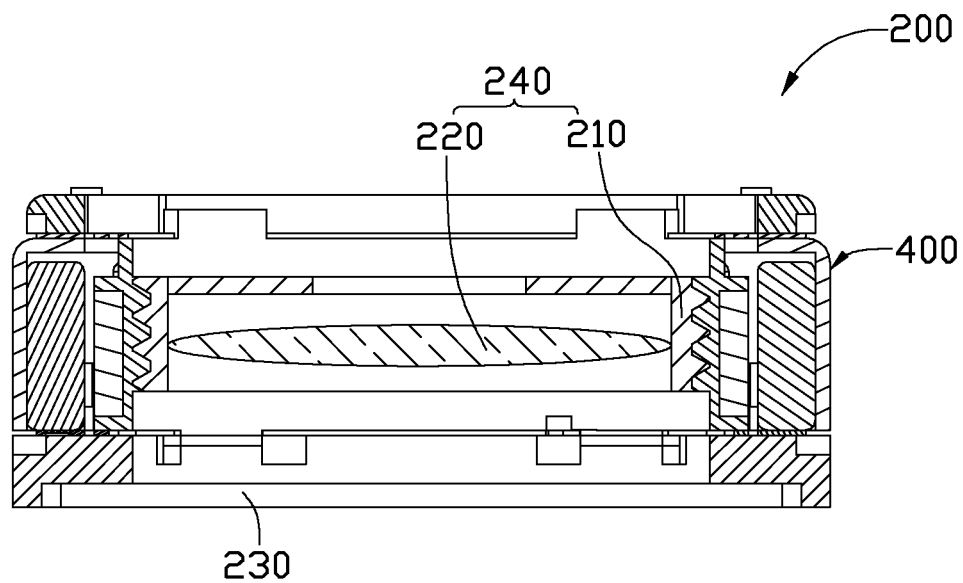
FIG. 4 is a schematic view of a camera module in accordance with a second embodiment.

Referring to FIG. 4, a camera module 200 in accordance with a second embodiment, is provided. The camera module 200 includes a VCM 400, a lens module 240 and image sensor 230. The VCM 400 can be the same as the VCM 100. The lens module 240 includes a lens barrel 210 and a lens 220 received in the lens barrel 210. The lens barrel 210 is externally threaded and engagable with the inner thread of the retainer of the VCM 400. The image sensor 230 is accommodated in the accommodating space of the base of the VCM 400, thus no separate base for the image sensor is needed. The entire camera module 200 is compact.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A voice coil motor, comprising:
   an outer shell having a through hole defined therein and comprising a plurality of sidewalls surrounding the through hole, a top tab integrally formed with the sidewalls in a manner that the top tab extends inwards toward the through hole and is substantially perpendicular to the sidewalls, and a plurality of first protrusions formed on the top tab;
   a fastening member comprising a plurality of first engaging holes formed therein;
   a first elastic member sandwiched between the top tab and the fastening member, and supported by and in contact with the top tab, the first elastic member having a plurality of second engaging holes formed therein, the first protrusions extending through and engaging in the first and second engaging holes;
   a plurality of magnetic members mounted on the inside of the sidewalls, respectively;
   a base;
   a second elastic member fixed on the base; and
   a movable assembly comprising a retainer and a coil of wire wrapped therearound, the retainer connected to the first and second elastic members, the magnetic members and the coil of wire configured for cooperating to drive the movable assembly to move in the outer shell.

2. The voice coil motor of claim 1, wherein each of the first and second elastic members is ring-shaped, and comprises a plurality of recesses formed in an inner wall thereof, and the retainer comprises a plurality of top protrusions and bottom protrusions, the top and bottom protrusions engaged in the corresponding recesses.

3. The voice coil motor of claim 1, wherein each of the magnetic members is a permanent magnet.

4. The voice coil motor of claim 1, wherein each of the first and second elastic members comprises an elastic portion, a rigid portion surrounding the elastic portion, and a plurality of L-shaped slots arranged between the elastic portion and the rigid portion.

5. The voice coil motor of claim 4, wherein the rigid portion of the second elastic member comprises a first part and a second part spaced from the first part, and the coil of wire is electrically connected to the first and second parts.

6. The voice coil motor of claim 5, wherein the first part has a first lead, the second part has a second lead, and the first and second leads are configured for electrically connecting to a power supply to electrify the coil of wire.

7. The voice coil motor of claim 5, wherein each of the first and second parts comprises a plurality of third engaging holes formed therein, and the base comprises a plurality of second protrusions formed thereon, for engaging in the third engaging holes, respectively.

8. The voice coil motor of claim 1, wherein the base comprises a through hole defined therein and an accommodating space in communication with the through hole.

9. The voice coil motor of claim 1, wherein the retainer has an inner thread formed therein.

10. The voice coil motor of claim 1, wherein the outer shell is made of electrically conductive material.

* * * * *